May 30, 1967  E. M. HAENELT, JR  3,322,369
HYDRAULICALLY ACTUATED TENSION
CONTROL FOR FISHING REELS
Filed June 29, 1965  4 Sheets-Sheet 1
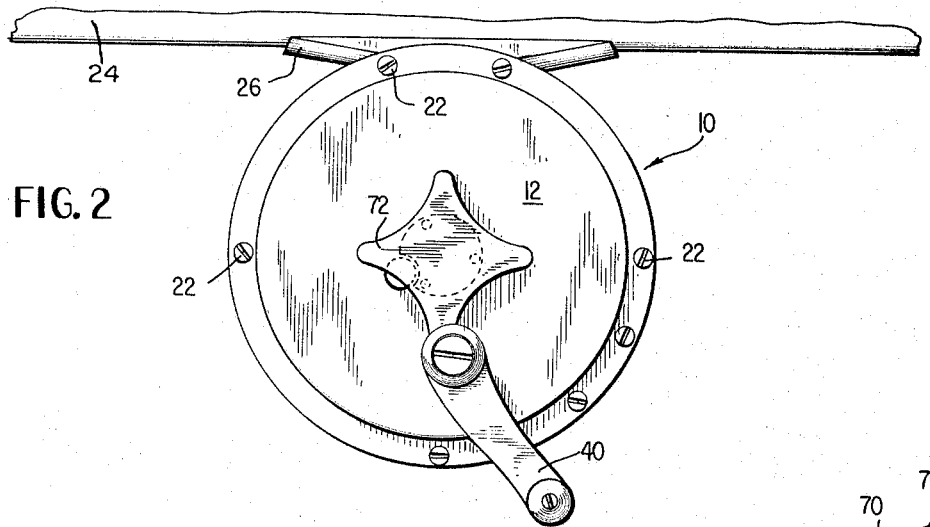
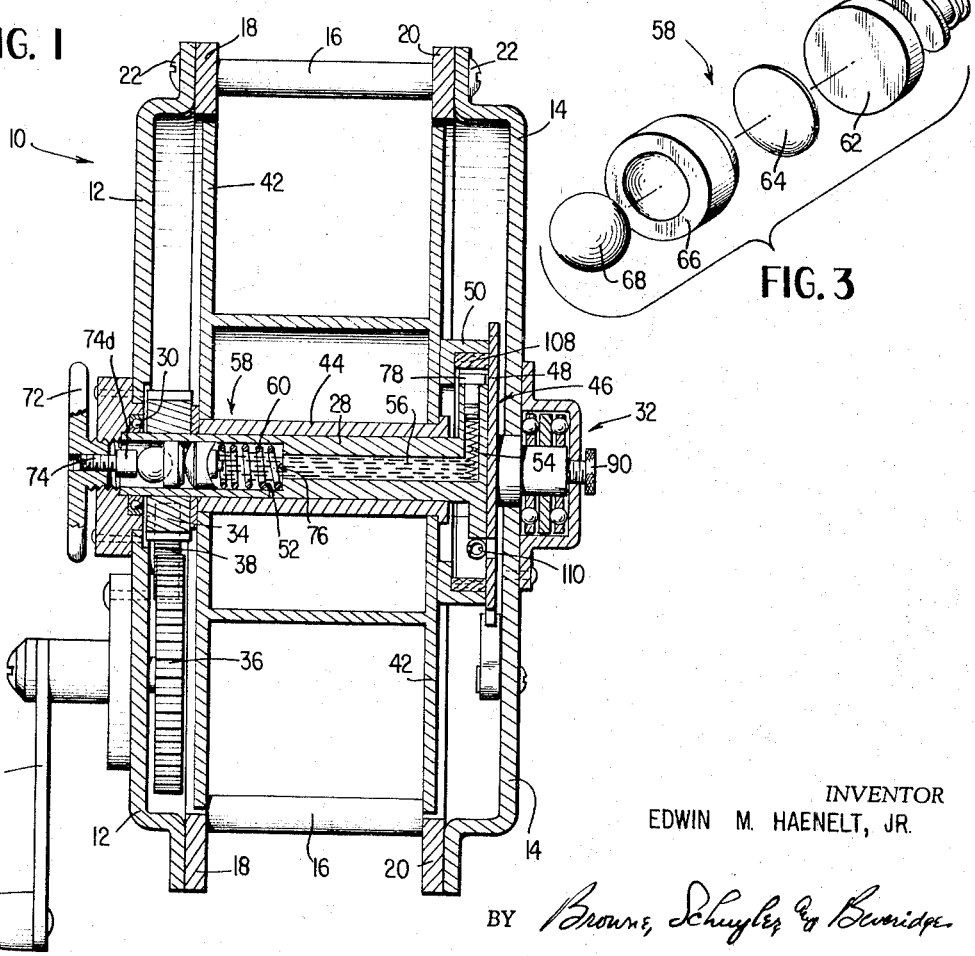
INVENTOR
EDWIN M. HAENELT, JR.
BY *Browne, Schuyler & Beveridge*
ATTORNEYS.

May 30, 1967
E. M. HAENELT, JR  
HYDRAULICALLY ACTUATED TENSION CONTROL FOR FISHING REELS
3,322,369
Filed June 29, 1965
4 Sheets-Sheet 2
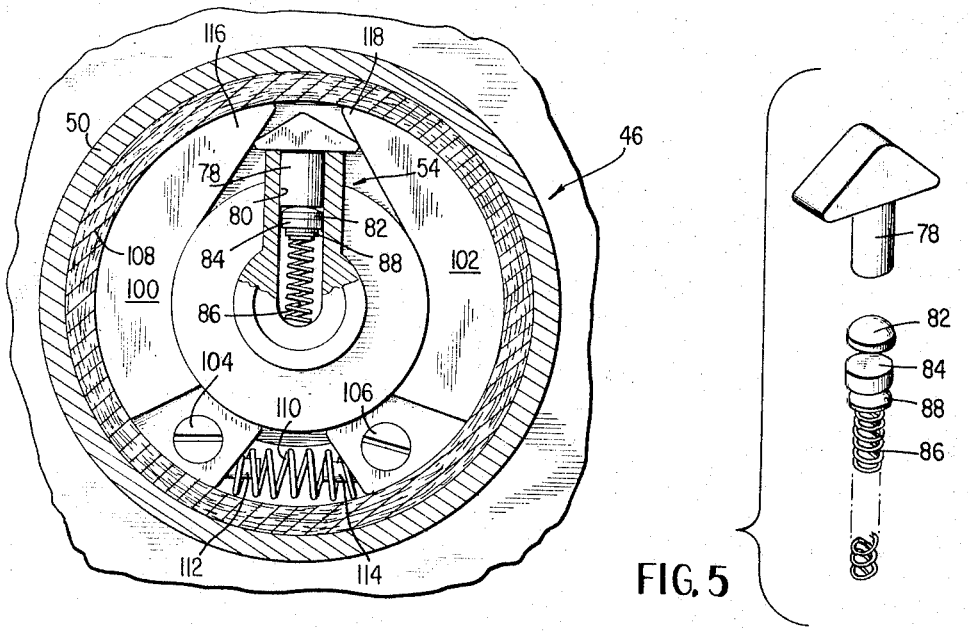
FIG. 4
FIG. 5
FIG. 6
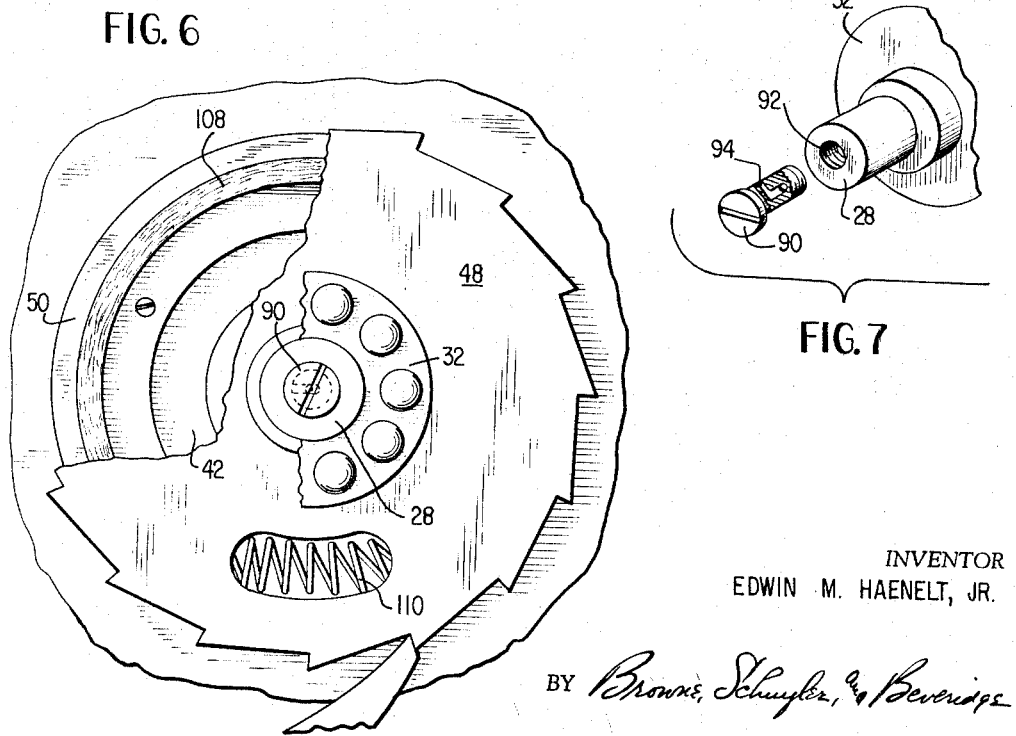
FIG. 7
INVENTOR  
EDWIN M. HAENELT, JR.
BY *Browne, Schuyler, & Beveridge*
ATTORNEYS INVENTOR.
EDWIN M. HAENELT, JR.
BY
Browne, Schuyler & Beveridge
ATTORNEYS.

INVENTOR.
EDWIN M. HAENELT, JR.

United States Patent Office 3,322,369
Patented May 30, 1967

3,322,369
HYDRAULICALLY ACTUATED TENSION CONTROL FOR FISHING REELS
Edwin M. Haenelt, Jr., 71 Sproat St.,
Middletown, N.Y. 10940
Filed June 29, 1965, Ser. No. 480,539
15 Claims. (Cl. 242—84.5)

This application is a continuation-in-part of my co-pending application Ser. No. 305,719, filed Aug. 30, 1963 which in turn is a continuation-in-part of an earlier application Ser. No. 221,917, filed Sept. 6, 1962, both of which are now abandoned, the disclosures of which are incorporated herein by reference in their entireties. This invention relates generally to fishing reels, and more particularly to a hydraulically actuated tension control for selectively regulating line tension of "free spool" and "spinning" reel units.

When casting with conventional free spool reels, backlash is normally prevented by applying a retarding drag to the line spool, either manually or by a mechanical braking mechanism, so as to reduce the momentum in the spool and thereby prevent snarling of the line as it unwinds from the reel. Moreover, after a fish strikes, the drag applied to the spool must be carefully controlled, otherwise the hook will become disengaged upon relaxation of line tension or the line will separate if subjected to an excessive over-load, allowing the hooked fish to escape. However, the various braking mechanisms previously utilized to control line tension either allow the spool to spin freely during casting of the line with the resultant backlash, or cannot be accurately adjusted to compensate for the wide range of drag sensitivity required in playing a hooked fish.

A similar problem is encountered in fishing reels of the "spinning" type. The term "spinning reel" is applied to reels of the type which are adapted for casting a line and lure by spinning the line from the end of a line-holding spool which is stationary during the line casting operation. In such a reel, as distinguished from other types of fishing reels, the spool is stationary both during the cast as well as during the retrieving of the line and lure. In some instances, provision is made for a limited amount of rotary movement of the spool relative to the spindle when the load on the line exceeds a predetermined adjusted amount during the retrieving movement.

As distinguished from prior art devices, the present invention provides line holding spools for reels of both the free spool and spinning type that are capable of rotating independently of their supporting frame or shaft when line tension exceeds a predetermined value, with means for selectively adjusting the maximum tension on the line within accurate limits. If line tension approaches an excessive value while the fish is being played, the spool or reel will rotate relative to the main body of the fishing reel, even while the driving mechanism is being rotated in the opposite direction to retrieve the fish. In other words, the line is permitted to slip or pay out under a constant tension without separation. By manually adjusting the tension controlling means, the operator can accurately control the maximum tension that will be applied to the line.

Accordingly, one of the features of this invention is to overcome the disadvantage of the prior art by providing hydraulic actuating means for selectively controlling the interrelated clutching and braking action of either a free spool or spinning reel to prevent backlash during casting as well as maintain the desired line tension required in playing a hooked fish.

Another important object of the present invention is to provide a hydraulically actuated drag coupling for selectively controlling line tension to prevent backlash as well as excessive strain on the line.

A further object of this invention resides in the provision of a hydraulically actuated frictional drag coupling for directly driving a reel spool which is free to rotate independently of the driving mechanism, so that by regulating the amount of relative frictional slippage between the clutch and reel, line tension can be selectively controlled.

Still another object is to provide a hydraulically actuated drag coupling for spinning reels in which the frictional drag of the reel relative to the drive mechanism can be selectively controlled to regulate the maximum line tension applied to the line.

A further object of the present invention is the provision of a drag coupling for fishing reels of the free spool or spinning type which is hydraulically actuated to regulate the relative movement of a free spool or spinning reel and thereby control the range of drag sensitivity applied to the line.

An additional object of this invention relates to a hydraulically actuated clutch drive for fishing reels which is positive in effect, sensitive in response to adjustment, readily adaptable to existing reels, thoroughly reliable and efficient in operation, relatively inexpensive to manufacture, and otherwise well adapted for the purposes for which the same is intended.

The foregoing, and other objects of the present invention, and the various features and details of operation and construction thereof are hereinafter more fully set forth and described with reference to the accompanying drawings which form a part hereof wherein identical numerals refer to similar parts throughout, and in which:

FIG. 1 is an elevational side view, partially in section, of a free spool fishing reel embodying the present invention;

FIG. 2 is a front elevational view of the reel illustrated in FIG. 1 mounted on a fishing rod;

FIG. 3 is an exploded perspective view of the master cylinder piston assembly and related actuating unit illustrated in FIG. 1;

FIG. 4 is a rear elevational view partially in section illustrating the hydraulically actuated clutch drive mechanism shown in FIG. 1;

FIG. 5 is an exploded perspective view of the slave cylinder-piston assembly illustrated in FIG. 1;

FIG. 6 is a rear elevational view, with parts removed, of the reel end plate of the free spool reel of FIGS. 1 through 5;

FIG. 7 is a perspective view of a bleeding unit illustrated in FIG. 6;

Figure 8:
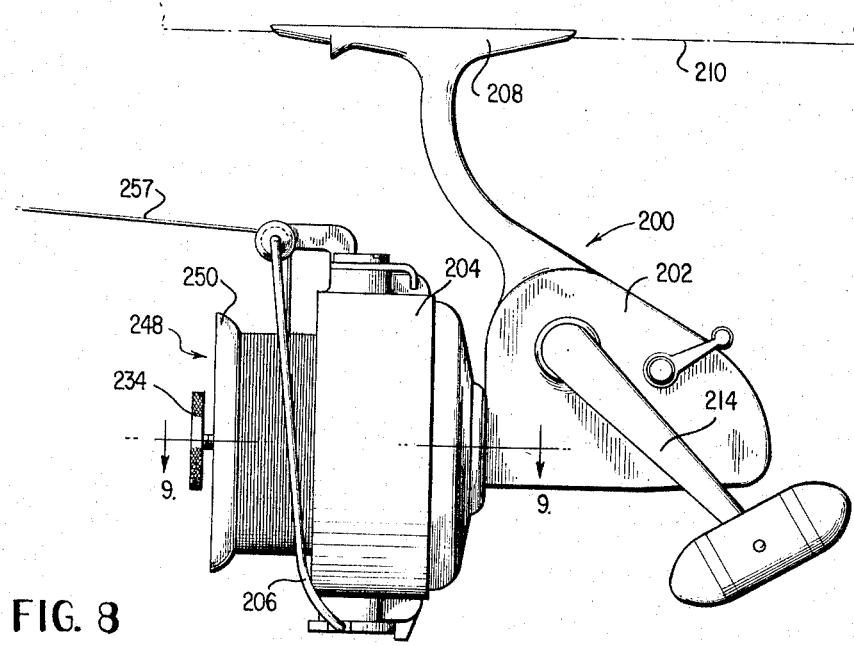
FIG. 8 is a side elevational view of a spinning reel embodying the present invention.

In the embodiments of the invention selected for illustration, only those parts of the reel which deviate from standard construction are shown in detail, as the hydraulically actuated drag coupling and clutch drive mechanism which form the subject matter of the present invention may be incorporated in any conventional reel where the line spool is mounted to revolve freely on its own axis independent of the spool driving mechanism.

Referring to the embodiment illustrated in FIGURES 1 to 7, and particularly FIGURES 1 and 2, reference numeral 10 designates generally a stationary fishing reel frame or housing having a pair of end plates 12 and 14 structurally interconnected in spaced relationship by a plurality of pillars 16 extending between reinforcing rings 18 and 20 which are rigidly united by fastening screws 22 in the conventional manner. In turn, the reel frame 10 is detachably secured to a fishing rod 24 by the customary clip plate 26.

The disclosed reel includes a spindle or spool shaft 28 journaled to bearing units 30 and 32 mounted on end plates 12 and 14, respectively, with the latter unit serving as an adjustable thrust bearing for the rear end of the spool shaft 28. A drive pinion 34 is directly secured to the front end of spindle 28 and is interconnected with a large driving gear 36 through an idler gear 38. In turn, drive gear 36 is coupled to a crank handle 40 which is offset with respect to the reel axis. Located between the end plates 12 and 14 is a freely rotatable line spool 42 supported by a central hub member 44 which is axially journaled to the spool shaft 28. Since line spool 42 is capable of rotating independently of the driving spindle 28, it is normally referred to as a "free spool."

The reel driving mechanism and free spool are interconnected through hydraulically actuated clutch drive member generally indicated by the numeral 46 which is mounted on a retaining plate 48 secured to the rotating spool shaft 28. Drive member 46 positioned to frictionally engage a related drum 50 secured to the side of the spool 42 in a manner to be more fully described hereinafter. The clutch driving mechanism is activated by a hydraulic unit which generally includes a master cylinder 52 disposed within the hollow spindle 28 and a slave cylinder 54 carried by the retaining plate 48 and interconnected with the master cylinder by a fluid passageway 56.

Disposed within the master cylinder 52 is a plunger assembly 58 slidably mounted within the shaft bore 60 which includes a neoprene piston 62, an aligning pressure plate 64, ball retainer 66, ball joint 68, and spring retainer 70, as shown in FIG. 3. Movement of the master plunger assembly 58 is controlled by an adjusting member 72 threadably secured to the front end plate 12. Threadedly mounted in adjusting member 72 is a compensating plunger 74, the head 74a of which engages ball 68. Plunger 74 is formed at its outer end with a screw driver slot so that plunger 74 may be adjusted relative to member 72 to compensate for expansion and contraction of hydraulic fluid caused by temperature variations. When the adjusting star 72 is turned to move the threaded rod 74 inwardly, it will force the ball retainer or actuator 66 against the annular face of pressure plate 64. If pressure plate 64 is slightly misaligned, the annular face will tend to re-align the pressure plate within the shaft bore 60 with a resultant equalized distribution of pressure on the piston that will prevent leakage of fluid past the plunger assembly 58. Plunger assembly 58 is urged toward front end plate 12 by a compression spring 76 to cause return movement of the plunger assembly when adjusting rod 74 is withdrawn toward the left in FIG. 1.

As illustrated in FIGS. 4 and 5, a somewhat modified plunger assembly has been provided in connection with slave cylinder 54, wherein a piston actuator unit 78, slidably mounted within the cylinder bore 80, contacts the annular face of an aligning pressure plate 82 which serves to maintain alignment of the neoprene piston element 84 in the manner previously described. To retain pressure on the slave cylinder piston, a compression spring 86 and related protective cap 88 have also been provided.

After the hydraulic actuating unit has been assembled, the master and slave cylinders can be charged by introducing fluid through opening 92, which communicates with the interconnecting fluid passageway 56 formed in spool shaft 28, as shown in FIG. 7. Thereafter, the system can be bled by allowing the entrapped air to escape through the discharge outlet 94 formed in the threaded plug 90. Since the hydraulic system is sealed, slave piston 84 and the related actuator unit 78 will move in synchronized response with the master cylinder plunger assembly 58.

With reference to the clutch drive assembly 46 illustrated in FIG. 4, a pair of segmental shoes 100 and 102 are pivotally mounted to the retaining plate 48 by pins 104 and 106 so that they may be moved eccentrically into frictional engagement with a lining 108 carried by the spool drum 50 when forced outwardly by movement of the piston actuator unit 78, as described more fully hereinafter. Shoes 100 and 102 are normally urged out of engagement with lining 108 by a compression spring 110 bearing against retainers 112 and 114 located adjacent the heel portion of each shoe which forces the shoe toe portions 116 and 118 radially inwardly.

It will be observed that the spool driving mechanism shown herein includes crank handle 40, drive gear 36, idler gear 38, and pinion gear 34 in driving engagement with the spool shaft 28, which in turn is directly coupled to the clutch retaining plate 48, while the line spool 42 is independently rotatable in either direction relative to the spool driving mechanism when the clutch unit 46 is disengaged. Any conventional ratchet and pawl assembly (FIG. 6) can be utilized to limit the direction of rotation of the spool driving mechanism so that the clutch drive unit will be free to turn only in the direction necessary to rewind the line while the line spool will be free to turn in either direction so as to allow the line to pay out under any desired degree of tension or be retrieved when driven in the opposite direction. When the pawl is withdrawn from engagement with the ratchet teeth, the driving mechanism can then be rotated in either direction. Preferably, the retaining plate 48 can be notched to provide ratchet teeth which will cooperatively engage a spring biased pivotal pawl assembly mounted on end plate 14 that can be shifted between engaging and retracted positions.

In operation, the adjusting star 72 serves to selectively regulate fluid pressure within the sealed hydraulic actuator unit. By moving the master cylinder plunger assembly 58 rearwardly (as viewed in FIG. 1) toward end plate 14, the entrapped fluid medium will force the slave cylinder piston 84 upwardly. In turn, the clutch actuating wedge 78 will exert a camming action upon the toe portions 116 and 118 of shoes 100 and 102, respectively, forcing the latter into frictional engagement with the encircling lining 108 secured to spool drum 50 thereby directly coupling the reel driving mechanism with the line spool 42. When the crank handle is turned, the spool can be driven until the clutch is disengaged or the frictional contact between the clutch shoes and drum lining is exceeded by tension being applied to the line, whereupon the line spool 42 will rotate relative to the reel driving mechanism. Thus, the frictional contacting engagement of the shoes with the lining regulates the extent of relative movement between the units, which in turn is selectively controlled by the hydraulic actuator unit. Since the hydraulic fluid within cylinders 56 and 54 expands and contracts with increasing and decreasing temperatures, respectively, plunger 74 can be adjusted toward the left and right, respectively, as viewed in FIG. 1, to compensate therefor and provide a constant frictional drag for each setting of member 72 regardless of temperature.

When casting, a fisherman has merely to relieve the hydraulic pressure exerted on the slave cylinder piston 84 by turning the adjusting star 72 to withdraw rod 74 and allow the master plunger assembly 58 to move under spring pressure toward the front plate 12 and relieve the hydraulic pressure, whereupon the clutch actuating wedge 78 will retract and the shoes will move inwardly under spring pressure to a position where they will press lightly against the lining so as to retard momentum of the spool 42 sufficiently to prevent backlash. After the desired amount of line has been payed out, frictional contacting pressure between the engaged shoes and drum lining is selectively controlled by turning the adjusting star to obtain the required hydraulic pressure needed to maintain the line under controlled tension. The pawl assembly can then be moved into engagement with the ratchet teeth so that the frictional drag applied to the spool by the shoes will directly control line tension over an extended range of sensitivity, or if desirable, the pawl need not be utilized if the fisherman chooses to manipulate the driving handle to play the fish. Movement of the crank handle to retrieve the fish will not effect the drag characteristics of the clutch, with the result that if an excessive tension is applied to the line while the fish is being played, the spool will rotate relative to the clutch shoes even while the driving mechanism is being rotated in the opposite direction to retrieve the fish. Thus, clutch slippage will permit the line to pay out under a constant tension without separation.

By way of illustration, if a 10-pound test line was being used, the frictional coefficient of drag would be set below the 10-pound limit so as to prevent separation of the line, and as soon as line tension exceeded the selected amount, the spool would rotate independently of the driving mechanism until the frictional coefficient of drag between the shoes lining was greater than the reduced tension applied to the line, thereby allowing retrieval of the hooked fish.

In reels of the spinning type, the line is wound on the spool by the rotation of a cup-shaped flier which surrounds the spool and rotates the line winding member around the spool. In casting, the line-winding member is moved out of contact with the line and the line is released from the reel by stripping it over the end flange of the stationary spool. During stripping the line is whirled or spun about an axis which is generally coincident with the axis of the stationary spool. Due to the centrifugal forces acting on the line, the orbit described by the spinning line is larger than the circumference of the end flange of the stationary spool. In reels of this type, resistance to the release of the line and flight of the lure is very low, thus permitting relatively longer cast than is possible under the same conditions with conventional types of reels in which the line spool rotates. Since there are no rotating parts sets in motion by the line during the cast, backlash and tangling of the line are reduced to permit a more perfect control over the line and lure at all times than is possible with conventional types of rotating spool reels.

Figure 9:
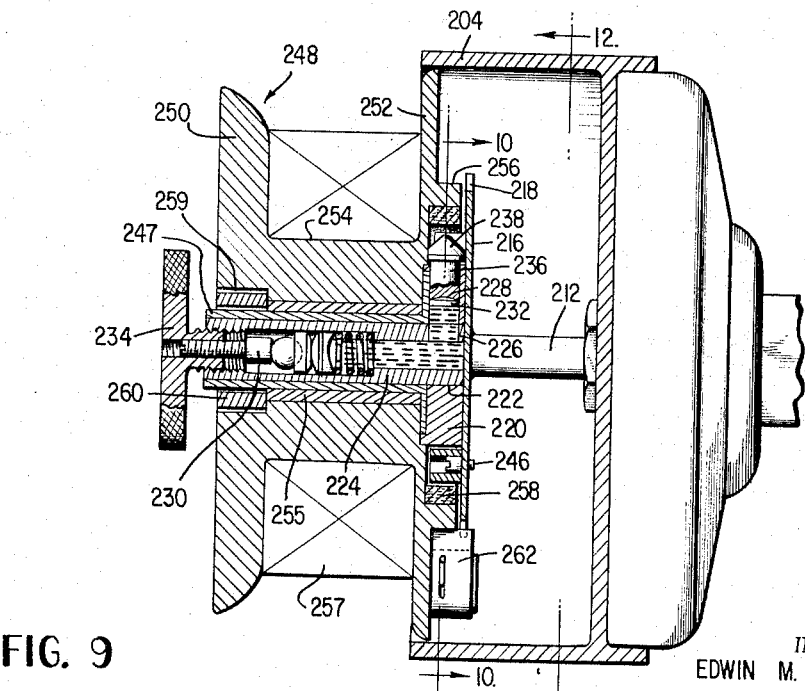
FIG. 9 is a sectional view taken on line 9—9 of FIG. 8.

With reference to the embodiment of FIGS. 8 and 9, reference numeral 200 identifies generally a spinning type fishing reel which includes a housing or frame 202 for a conventional drive mechanism, a cup-shaped flier 204 rotatably mounted on the housing, and a line winding member 206 is shown in its operative position for winding the line around spool 248 upon rotation of flier 204. During casting, member 206 may be pivoted to an inoperative position out of contact with the line in a manner well known in the art. Projecting from housing 202 into the interior of the cup-shaped flier 204 is a reciprocating shaft 212 which, upon operation of the drive mechanism through a crank 214, reciprocates axially in the interior of the flier in a manner well known in the art. Housing 202 encloses a conventional drive mechanism, one such type being disclosed in the United States Patent No. 2,546,465. Spinning reel 200 may be mounted on a fishing rod or pole 210 in a conventional manner by a bracket or support arm 208 extending from the housing.

Secured to the end of the reciprocating shaft 212 is a plate member 216 formed at its periphery with a plurality of ratchet teeth 218. Plate 216 is secured to the end of shaft 212 by welding or other conventional means. Flier 204 is rotated about the axis of shaft 212 when crank 214 is turned in a manner well known in the art which in turn causes shaft 212 to reciprocate in the interior of flier 204.

Secured to the opposite side of plate 216 of shaft 212 is a disk 220 having a central aperture 222 formed therein which receives one end of a hollow shaft 224. Shaft 224 is formed with an opening 226 at its lower end which communicates with a passage 228 in disk 220. The interior of shaft 224 defines a master cylinder, and passage 228 defines a slave cylinder. Slidably disposed in slave cylinder 228 is a piston assembly 232. An adjusting nut 234 is threadedly mounted in shaft 224, and is internally threaded to receive a piston 230 which is independently adjustable relative to adjusting nut 234 to compensate for temperature expansion and contraction of the hydraulic fluid as in the previously described embodiment.

Slidably mounted in slave cylinder 228 is an actuating plunger 236 having a wedge shaped actuating head 238. Mounted on the outer face of plate 216 by a pin 246 is an arcuate drag member 240 defining a unitary annular shoe provided with arcuate shoe segments 242 and 244. Shoe segments 242 and 244 each have heel portions 242a and 244a, respectively, which are interconnected by a central portion 245 through which pin 246 extends to connect the drag member with ratchet plate 216. Shoe segments 242 and 244 are formed at their opposite ends with toe portions 242b and 244b, respectively, which cooperate with the wedge shaped head 238 of actuating plunger 236. When adjusting nut 234 is rotated in a direction to actuate piston 230 toward plate 216, the resulting increase in hydraulic pressure forces piston 232 and actuating plunger 236 outwardly, and the wedge shaped head 238 exerts a camming action upon toe portions 242b and 244b tending to resiliently spread segments 242 and 244 apart about central portion 245.

Rotatably mounted on a hollow spindle 247 which is secured at one end to disk 220, and which concentrically surrounds shaft 224, is a spinning reel 248. Spinning reel 248 includes flanges 250 and 252 connected by a central hub portion 254 having a hollow, cylindrical bearing sleeve 255 extending therethrough and supporting the spinning reel on shaft 247. Fishing line 257 is wound around the central hub portion 254, and the end thereof extends over the line winding member 206 in a manner well known in the art. As crank 214 is rotated, flier 204 rotates about the axis of shaft 212 to wind the line about the spinning reel 248; the resulting reciprocation of shaft 212 cooperating with the line winding member 206 to evenly distribute the line along the axis of hub 254.

Figure 10:
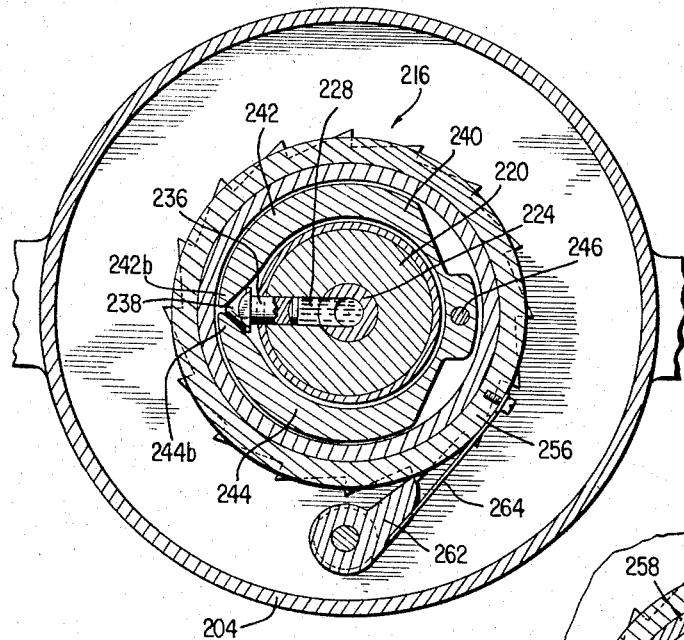
FIG. 10 is a sectional view taken on line 10—10 of FIG. 9.
Figure 11:
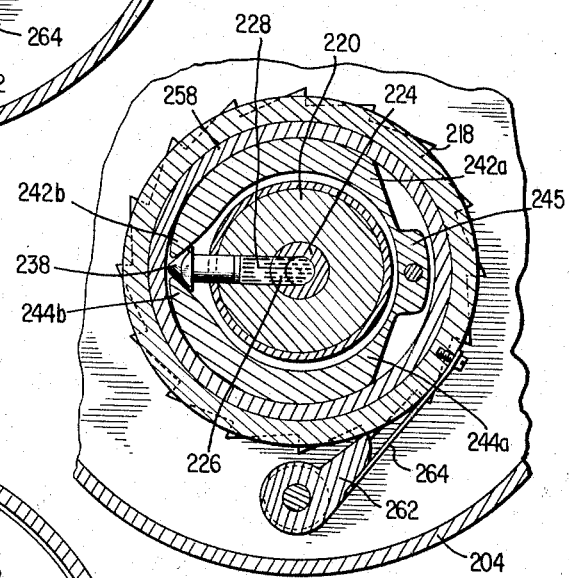
FIG. 11 is a view similar to FIG. 10 with the drag control clutch engaged.
Figure 12:
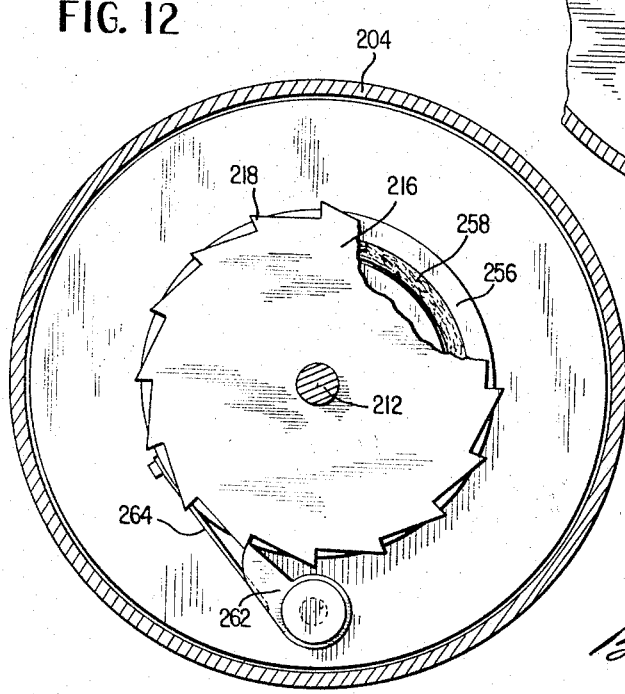
FIG. 12 is a sectional view taken on line 12—12 of FIG. 9.

Formed on the outer wall of flange 252 of the spinning reel is an annular drum 256 having frictional lining material 258 secured to its inner wall (FIGS. 10, 11 and 12). The outer face of flange 250 of reel 248 is recessed at 259 to receive a cylindrical bushing 260.

Pivotally mounted on the outer face of flange 252, adjacent the periphery of the drum 256 is a ratchet pawl 262 which is biased into engagement with teeth 218 by a leaf spring 264. Pawl 262 permits rotation of reel 248 in a counter-clockwise direction as viewed in FIGS. 10 and 11 but prevents clockwise rotation of the reel due to the engagement of the pawl with teeth 218.

When actuating plunger 236 is fully retracted into slave cylinder 228, shoes 242 and 244 assume a position out of engagement with the frictional lining material 258 on the inner wall of drum 256 as shown in FIG. 10. By adjusting nut 234, piston 230 forces fluid through master cylinder 224, aperture 226, and into slave cylinder 228 to urge piston 232 and plunger 236 in an outward direction. Consequently, head 238 of the actuating plunger causes toe portions 242b and 244b to spread apart which in turn causes segments 242 and 244 to engage the inner wall of lining 258 and exert a frictional drag on the spinning reel. It is therefore apparent that the tension on line 257 can be adjusted manually by the position of nut 234.

For example, if line 257 is a ten pound test line, nut 234 can be adjusted so that as soon as line tension exceeds 10 pounds, reel 248 will rotate independently of shaft 247 until the frictional coefficient of drag between the shoes and lining is greater than the reduced tension applied to the line thereby allowing retrieval of a hooked fish.

While a single slave cylinder and plunger assembly has been illustrated, two or more slave assemblies can be employed. If two, for example, are provided, they would be diametrically spaced with respect to the central axis of the reel shafts. With the latter construction, the necessity for the wedge-shaped plunger and camming action is eliminated.

The improved hydraulically actuated tension control mechanism thus described provides a compact structure which may be mounted in the end plates of a conventional free spool reel as well as spinning reel without extensive modification, and has been designed to facilitate disassembly for inspection, adjustment and repair. It is to be understood that, although preferred embodiments of the invention have been shown in the drawings and described with considerable particularity in the foregoing specification, the invention is not limited to the specific details of construction shown and described but includes all modifications coming within the scope of the appended claims and their equivalents.

What I claim is:

1. A fishing reel comprising a frame dimensioned to be attached to a fishing rod and the like, a shaft carried by the frame, a line holding spool rotatably mounted on the shaft, clutch means for establishing a frictional connection between said shaft and said spool including a hydraulic cylinder located in said shaft and having a master piston assembly therein including a master piston, a pressure plate having a spherical face located on one end and a planar face on the other end engageable with said piston, a ball retainer member having one end engageable with the annular face of said pressure plate and having a recess in the other end thereof, a ball member disposed in the recess of said retainer member, and piston actuating means mounted in the frame for selectively moving the assembly in one direction to engage said clutch means, said piston actuating means including a screw threadedly received therein for adjusting the stroke of said master piston.

2. The fishing reel as defined in claim 1, wherein said master cylinder has an enlarged portion forming a shoulder and wherein there is provided a spring in said enlarged portion urging said master piston assembly in a direction opposite to said one direction.

3. In a fishing reel having a portable frame including spaced end walls, and a shaft rotatably supported in the frame between the end walls, a spool supported on the shaft for rotation relative thereto and manual drive means including a crank for rotating the shaft, a hydraulically actuated friction clutch for coupling the shaft to the spool including a hydraulic cylinder located solely within the shaft and an actuator mounted in one of the side walls for selectively increasing and decreasing the hydraulic pressure in the cylinder to thereto control rotation of the spool relative to the shaft, said cylinder having a master piston therein operable in one direction in response to said actuator and means in the cylinder manually operable externally of the frame adjcent said actuator for selectively adjusting the effective maximum stroke of said master piston to compensate for expansion and contraction of hydraulic fluid in the cylinder.

4. The combination as defined in claim 3, wherein there is provided a compression spring located in said cylinder for returning said piston in the opposite direction upon release of hydraulic pressure by said actuator.

5. A fishing reel comprising a frame, a drive shaft journaled to said frame for rotation, driving means supported by said frame for rotating said drive shaft, a line spool rotatably mounted on said shaft, clutch means for drivably connecting said drive shaft and said spool, actuating means for engaging said clutch means to thereby drive said spool and for disengaging said clutch means, said actuating means including a hydraulic master cylinder located in means mounted within said piston-actuating means for adjusting said shaft and having a master piston slidably received therein, piston-actuating means for moving said piston in one direction to engage said clutch means, and means the maximum stroke of said master piston to compensate for expansion and contraction of said hydraulic fluid in said cylinder, said last-mentioned means including a screw threadedly received in said piston actuating means for movement relative thereto.

6. A fishing reel of the spinning type dimensioned to be attached to a fishing rod and the like, comprising in combination, a shaft, means mounting said shaft for reciprocating movement, a line spool rotatably mounted about said shaft and reciprocable therewith, and hydraulically operated tension control means including a friction member engageable with said spool to control rotation thereof.

7. The reel defined in claim 6 wherein said spool has an annular member fixed on one of its sides and engageable by said friction member, and wherein said hydraulically operated tension control means includes a hydraulic cylinder extending radially of said shaft generally at said one side of the spool and a hydraulic piston in said cylinder operable to cause engagement of said friction member with said annular member.

8. The reel defined in claim 6 wherein said hydraulically operated tension control includes a hydraulic cylinder in said shaft having a piston slideable therein, a manually operable actuator extending in said shaft for applying hydraulic pressure on said piston, and means extending in said cylinder and manually operable externally of the reel adjacent said actuator for selectively adjusting the effective maximum stroke of said piston.

9. The reel defined in claim 6 wherein said hydraulically operated tension control means includes a hydraulic cylinder in said shaft having a piston, and a manually operable rotary actuator located externally of said shaft for applying and reducing hydraulic pressure on said piston.

10. The reel defined in claim 6 wherein said rotary actuator includes a member having threads for advancing and retracting the actuator to increase or decrease hydraulic pressure on said piston.

11. A fishing reel dimensioned to be attached to a fishing rod or the like, the reel comprising in combination; a fishing line spool, means supporting said line spool for rotation, and manually operable tension control means for regulating the rotation of said spool and consequently tension in the fishing line, said tension control means including a friction member frictionally engageable with said spool and hydraulic means for actuating said friction member into engagement with said spool, said means supporting said spool for rotation including a shaft, said hydraulic means including a hydraulic cylinder in said shaft and a piston in asid cylinder, a manually operable actuator controlling said hydraulic pressure in said cylinder for moving said piston in one direction to cause engagement of said friction member with said spool, and means extending in said cylinder and manually operable externally of the reel adjacent said actuator for selectively adjusting the effective maximum stroke of said piston.

12. The fishing reel defined in claim 11 wherein said actuator is received in one end of said shaft and wherein said shaft has a passage in the opposite end communicating with said cylinder for supplying hydraulic fluid to the cylinder, and wherein there is further provided an adjustable closure member in said passage having a leak port communicable with atmosphere.

13. The fishing reel defined in claim 12 wherein the first mentioned cylinder in said shaft is a master cylinder, said piston in the master cylinder being movable in one direction to cause engagement of said friction member with said spool, and wherein there is further provided a first spring in said master cylinder urging the piston in said master cylinder in a direction opposite to said one direction, and wherein there is further provided a second spring in said slave cylinder urging said slave piston toward said friction member.

14. A fishing reel dimensioned to be attached to a fishing rod or the like, the reel comprising in combination; a fishing line spool, means supporting said line spool for rotation, and manually operable tension control means for regulating the rotation of said spool and consequently tension in the fishing line, said tension control means including a friction member frictionally engageable with said spool and hydraulic means for actuating said friction member into engagement with said spool, said means supporting said spool for rotation including a shaft, said hydraulic means including a hydraulic cylinder in said shaft and a piston in said cylinder, said shaft having in one end a passage communicating with said cylinder for purposes of filling said cylinder with hydraulic fluid, and an adjustable closure member closing said passage and extending externally of said reel, said closure member having a leak port communicable with the atmosphere in one direction of said closure member.

15. The fishing reel defined in claim 14 wherein said passage has screw threads and wherein said closure member is a screw engaged in said threads.

References Cited

UNITED STATES PATENTS

| | | | |
|---|---|---|---|
| 1,129,441 | 2/1915 | Baldwin et al. | 192—96 |
| 1,851,226 | 3/1932 | White | 60—54.6 |
| 1,885,121 | 11/1932 | Loweke. | |
| 2,012,418 | 9/1935 | Burke | 192—80 X |
| 2,045,882 | 6/1936 | Stromgran | 192—111 X |
| 2,159,137 | 5/1939 | Dety | 192—85 |
| 2,265,694 | 12/1941 | Lane et al. | 192—85 X |
| 2,548,317 | 4/1951 | MacBlane | 242—84.54 X |
| 3,034,604 | 5/1962 | Holmes | 242—84.5 X |

FOREIGN PATENTS 612,850  9/1926  France.

FRANK J. COHEN, *Primary Examiner.*

STANLEY N. GILREATH, B. S. TAYLOR,
*Assistant Examiners.*